US009510566B2

(12) United States Patent
Pantazes

(10) Patent No.: US 9,510,566 B2
(45) Date of Patent: Dec. 6, 2016

(54) WEARABLE CANINE AND FELINE COLLAR WITH CAMERA AND ADDED FEATURES

(71) Applicant: Theadore Pantazes, Potomac, MD (US)

(72) Inventor: Theadore Pantazes, Potomac, MD (US)

( * ) Notice: Subject to any disclaimer, the term of this patent is extended or adjusted under 35 U.S.C. 154(b) by 42 days.

(21) Appl. No.: 14/750,352

(22) Filed: Jun. 25, 2015

(65) Prior Publication Data

US 2016/0302391 A1    Oct. 20, 2016

Related U.S. Application Data

(60) Provisional application No. 62/148,407, filed on Apr. 16, 2015.

(51) Int. Cl.
*A01K 27/00* (2006.01)
*A01K 15/02* (2006.01)

(52) U.S. Cl.
CPC ........... *A01K 27/009* (2013.01); *A01K 27/001* (2013.01); *A01K 27/006* (2013.01); *A01K 15/021* (2013.01)

(58) Field of Classification Search
CPC .. A01K 15/021; A01K 27/009; A01K 15/023; A01K 11/008; A01K 15/02; A01K 15/029
USPC ....... 119/712, 719, 720, 721, 856, 859, 908; 340/573.1, 573.2, 573.3
See application file for complete search history.

(56) References Cited

U.S. PATENT DOCUMENTS

| | | | |
|---|---|---|---|
| 4,797,736 A | 1/1989 | Kloots et al. | |
| 6,067,018 A * | 5/2000 | Skelton | A01K 11/008 119/721 |
| 6,720,879 B2 | 4/2004 | Edwards | |
| 6,970,090 B1 * | 11/2005 | Sciarra | A01K 15/023 119/795 |
| 7,411,492 B2 | 8/2008 | Greenberg | |
| 7,424,867 B2 | 9/2008 | Kates | |
| 7,814,865 B2 * | 10/2010 | Tracy | A01K 15/021 119/720 |
| 8,342,135 B2 * | 1/2013 | Peinetti | A01K 15/023 119/721 |
| 8,543,134 B2 | 9/2013 | Lopez et al. | |
| 8,624,743 B2 | 1/2014 | Langer et al. | |
| 8,783,212 B2 * | 7/2014 | Bellon | A01K 15/021 119/720 |

(Continued)

FOREIGN PATENT DOCUMENTS

| | | | |
|---|---|---|---|
| JP | 2007117225 A | 5/2007 | |
| JP | 2012078616 A | 4/2012 | |

OTHER PUBLICATIONS

Motorola Scout 5000 Collar with Camera, PTT & Cellular SCOUT5000, "Adorama More Than a Camera Store", retrieved Feb. 29, 2016, http://www.adorama.com/moscout5000.html., pp. 1-3.

(Continued)

*Primary Examiner* — Yvonne Abbott-Lewis
(74) *Attorney, Agent, or Firm* — Blank Rome, LLP

(57) ABSTRACT

A multifunction animal collar. The collar including a plurality of electronic components for collecting and transmitting audio and visual information to and from a remote user in real time. The plurality of electronic components including a satellite communication chip, a GPS chip, a camera, a thermographic camera, infrared camera, a microphone, a speaker, and a light. The satellite communication chip capable of transmitting and receiving viewed images and sounds to a remote user for viewing on an external electronic device and back to the animal in real time.

19 Claims, 8 Drawing Sheets

(56) References Cited

U.S. PATENT DOCUMENTS

| | | | |
|---|---|---|---|
| 8,839,744 B1 | 9/2014 | Bianchi et al. | |
| 2002/0152970 A1* | 10/2002 | Takeda | A01K 15/021 |
| | | | 119/719 |
| 2003/0013420 A1 | 1/2003 | Redmond | |
| 2006/0011144 A1* | 1/2006 | Kates | A01K 15/02 |
| | | | 119/719 |
| 2007/0056531 A1 | 3/2007 | Renforth | |
| 2007/0095304 A1 | 5/2007 | Rosenberg et al. | |
| 2007/0204803 A1* | 9/2007 | Ramsay | A01K 27/009 |
| | | | 119/720 |
| 2007/0204804 A1* | 9/2007 | Swanson | A01K 15/023 |
| | | | 119/721 |
| 2007/0221140 A1* | 9/2007 | Warren | A01K 27/009 |
| | | | 119/859 |
| 2007/0266959 A1 | 11/2007 | Brooks | |
| 2009/0109292 A1 | 4/2009 | Ennis | |
| 2010/0282184 A1 | 11/2010 | Larson | |
| 2012/0204811 A1 | 8/2012 | Ryan | |
| 2012/0255505 A1 | 10/2012 | Gauthier | |
| 2015/0366166 A1 | 12/2015 | Mueller | |

OTHER PUBLICATIONS

"Scout 5000 is a Cutting-Edge Wearable—For Your Dog", retrieved Feb. 18, 2016, http://wearables.reviewed.com/features/scout-5000-is-a-new-wearable-for-you-dog., pp. 1-2.
"WUF—The World's Smartest Dog Collar" retrieved Feb. 29, 2016, http://www.getwulf.com. pp. 1-5.

* cited by examiner

WEARABLE CANINE AND FELINE COLLAR WITH CAMERA AND ADDED FEATURES

CROSS REFERENCE TO RELATED APPLICATIONS

This application claims priority to U.S. Provisional Patent Application No. 62/148,407 filed 16 Apr. 2015 to the above named inventor, and is herein incorporated by reference in its entirety.

FIELD OF THE PRESENT INVENTION

The invention relates generally to an interactive dog and cat collar with a camera, an thermal imaging camera, an infrared camera, a web camera, two way audio communication, GPS, and display light for both working dogs and home pets which allows the user to interact with their pet or working animal in real time via satellite transmission through any computer, mobile phone, tablet, smart phone, or other internet enabled device worldwide.

BACKGROUND OF THE INVENTION

Currently there are a number of solutions for interacting with working animals as well as pets. Some of these solutions attempt to use a collar with a tracking device, but these solutions fail to meet the needs of the market because the collar only provides the animal's location.

U.S. Pat. No. 8,543,134 to Lopez et al. discloses an interactive communication and tracking collar. This collar communicates wirelessly over a cellular network and includes a cellular antenna, a means to receive and transmit voice, a GPS tracking unit, lights, and speakers. The collar is designed for attachment to a dog and provides an owner with the ability to track and communicate with their animal. The Lopez device does not provide for any visual devices that could relay a viewed image in a standard, thermal, or infrared format to a user in a remote location away from the animal in real time. Additionally, the Lopez et al. device is based upon cellular technology and does not utilize satellite transmission. The present invention is intended to save lives of missing people and aid and advance working dogs and law enforcement agencies while performing duties capable of saving lives for search and rescue missions, help law enforcement, and pet owners by providing real time imagery in standard, infrared, and thermal views and two-way audio communication to a handler at a remote distance away from an animal.

The present invention provides an advanced pet collar for placement onto an animal for the remote relay of audible and visual information to a user at a remote location in real time. The collar includes three types of cameras (standard, thermographic, infrared), a GPS satellite tracking chip, a means to enable two-way communication, and lights for visibility. In the preferred usage the device is affixed to a working animal and can relay search and rescue information to a remote user in real time via a satellite uplink.

SUMMARY OF THE INVENTION

An advanced collar for placement onto an animal is disclosed. The collar is primarily designed for placement onto an animal, preferably a working dog, to provide real time auditory and visual information to a handler in a remote location. The collar includes several advanced electronic components integrated into its interior and a unique camera mounting design to ensure that a clear view is provided to a user. It is therefore an object of the present invention to provide a new, improved, and advanced animal collar that provides real time visual and auditory data to a user that has all of the advantages of the prior art without any of the disadvantages present within this art.

It is an object of the present of invention to provide a collar that is useful for both working animals to save lives and family pets. Furthermore, it would also be advantageous to have an apparatus that utilizes multiple technologies. Still further, it would be advantageous to have an apparatus that shares video and data via satellite to any Internet enabled electronic device worldwide. Therefore, there currently exists a need in the market for a apparatus that is a webcam enabled dog and cat collar which allows the user to interact with their pet or working animal in real time via satellite transmission through any computer, tablet, mobile phone, smart phone, or other Internet enabled device worldwide. Further, it would be advantageous for the collar to be equipped with GPS satellite tracking and thermal and infrared cameras and sensors.

The aforementioned collar provides an integrated webcam, speaker and microphone that allows real time live two-way audio and visual communication interactions with working dogs and pets. The collar further includes a switch to allow for light to be projected in dark areas for safety when on walks or performing tasks.

The invention advantageously fills the aforementioned deficiencies by providing an interactive webcam dog and cat collar which allows the user to interact with their pet in real time via satellite transmission through any computer, mobile phone, tablet, smart phone, or other internet enabled device worldwide, which provides opportunities for added interaction with working dogs and family pets.

This interaction includes the ability for the multifunction collar to enable two-way audio and visual communication between an animal and its owner/handler in real time from separate Internet enabled devices. Accordingly, the user of the collar may interact in two-way communication with the animal through a preprogrammed Internet device at the present location of the animal, wherein the owner/handler will have the ability to observe the animal via the collar and the animal will have the ability to view the owner/handler via the preprogrammed device. Within this context, the preprogrammed device includes an internet enabled device with product software or device with a dedicated application for specific interaction with the collar. In use the owner/handler will activate the collar on the animal, activate the preprogrammed device where the animal is present and the animal will have the ability to view the owner/handler in real time. This will allow for two-way audio and video communication through any computer, mobile phone, tablet, smart phone, or other Internet enabling device worldwide.

In addition to communication solely between an owner/handler, additional individuals/groups are able to view the collar audio and video feeds in real time via a remote location. This will be handled via a hosted and secure website or portal that will allow password protected viewing of specific real-time feeds. This capability allows additional specialists, experts, law enforcement personnel, or family members the ability to view the real time audio and video feed broadcast over satellite.

The invention is an all-in-one multi-functional product that is user friendly for working dogs and cats, pets, and owners.

The apparatus has GPS satellite tracking which will help locate lost pets or working dogs to pinpoint their exact locations.

The apparatus has thermal imaging and infrared cameras and sensors that are able to display images to a user to better assist working dogs in rescue missions, fugitive apprehensions, security duties, and pet owners that can be viewed from any computer, tablet, mobile phone, smart phone, or other internet enabled device in real time. Thermal imaging will help assist for viewing at night and to see behind obstructions so the working dogs and handlers can perform their tasks more effectively. Real time viewing will further enhance these activities. The apparatus has the capability of switching between these various images in real time depending upon the given situation.

The apparatus fulfills the need for added technologies to assist working dogs and for interaction with pets.

Among other things, it is an advantage of the invention to provide an interactive webcam dog and cat collar which allows the user to interact with their working dog or pet in real time via satellite transmission through any computer, mobile phone, tablet, smart phone, or other internet enabled device worldwide that does not suffer from any of the problems or deficiencies associated with prior solutions.

It is still further an advantage of the invention to have a speaker, a microphone and a webcam built into the collar that allows real time live two way audio and visual communication and interactions with working dogs and pets. The webcam built on the collar will allow anyone to view their pets in real time live communications from any location worldwide by simply and securely accessing the camera feed from any computer, mobile phone, tablet, smart phone, or other internet enabled device allowing a user to interact with their working dog or pet.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
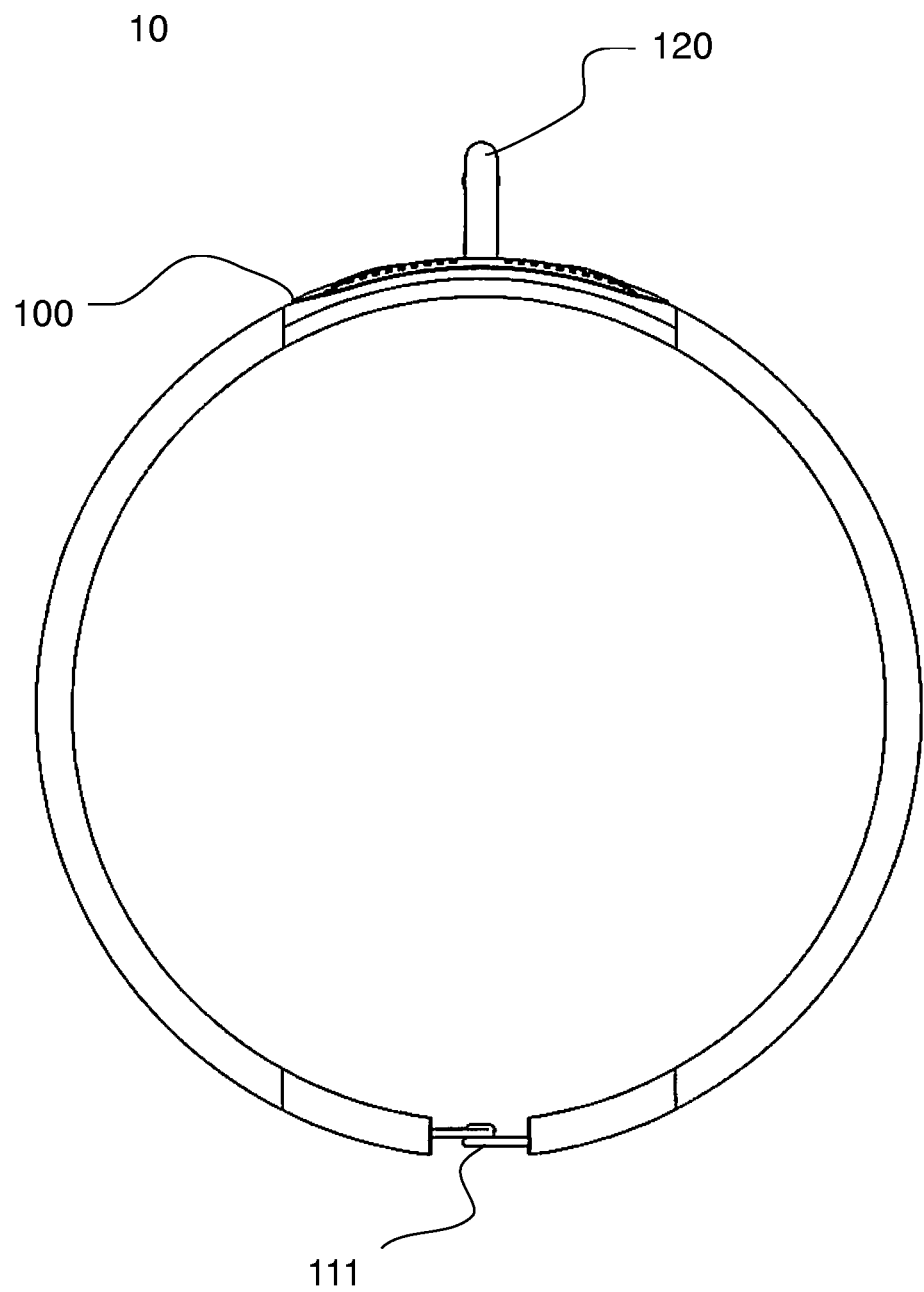
FIG. 1 shows the back view of the device, according to the present invention.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus.

These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention is directed to be an interactive dog, cat, and working animal collar that allows the user to interact with their pet or working animal in real time via satellite transmission through any computer, mobile phone, tablet, smart phone, or other Internet enabled device worldwide. The interactive collar further includes GPS satellite tracking and thermal and infrared imaging sensors. Cameras (standard, infrared, and thermographic), a speaker and a microphone are built into the collar to allow for real time live audio and visual communication and interaction with pets and working animals. The collar additionally includes a light for illumination of dark areas when walking the animal or preforming tasks.

Figure 2:
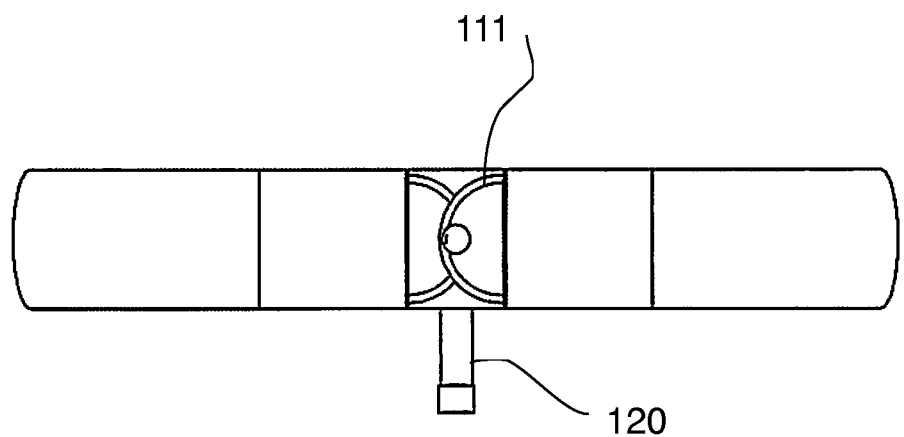
FIG. 2 shows the bottom view of the device, according to the present invention.
Figure 3:
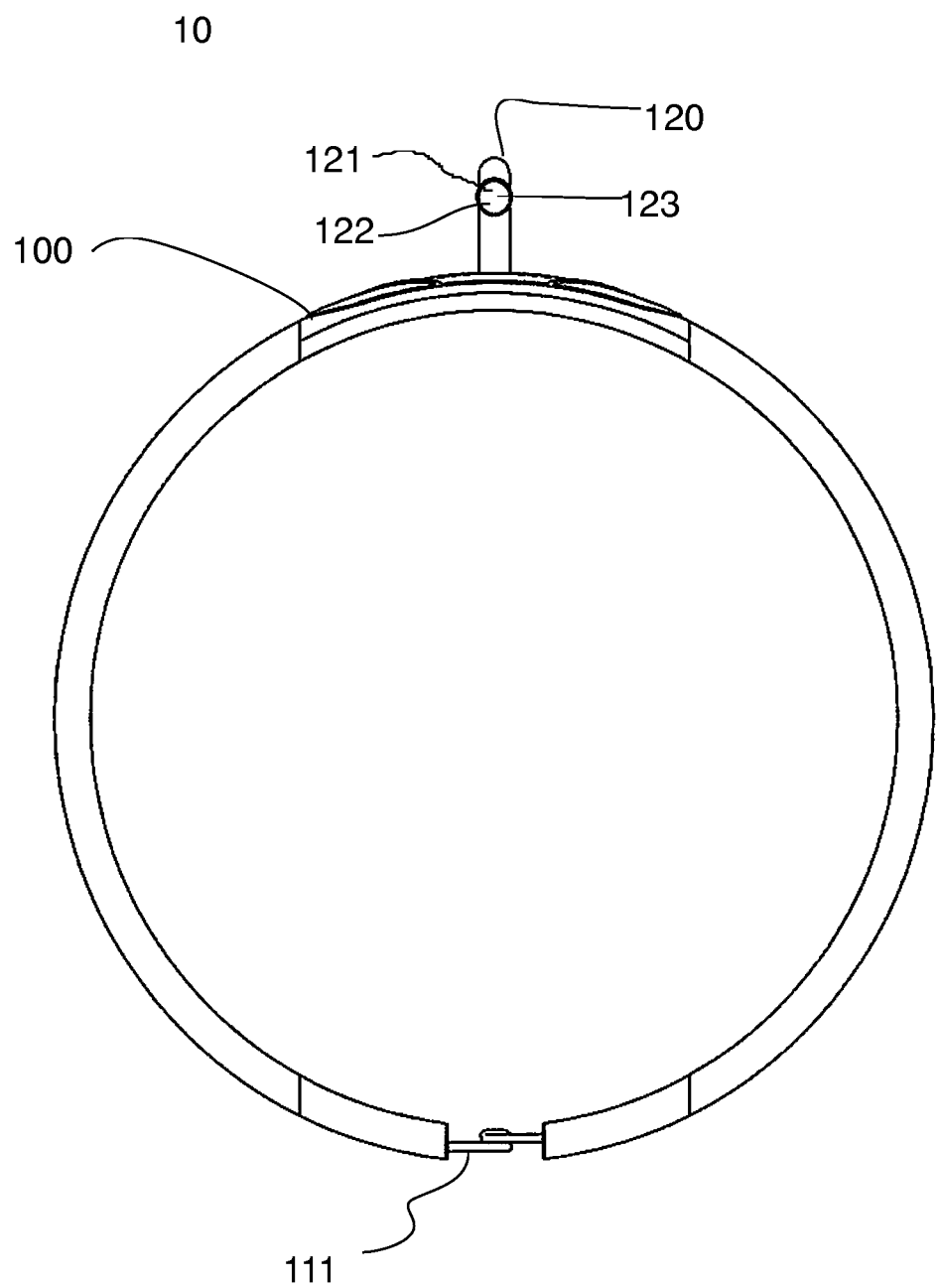
FIG. 3 shows the front view of the device, according to the present invention.
Figure 4:
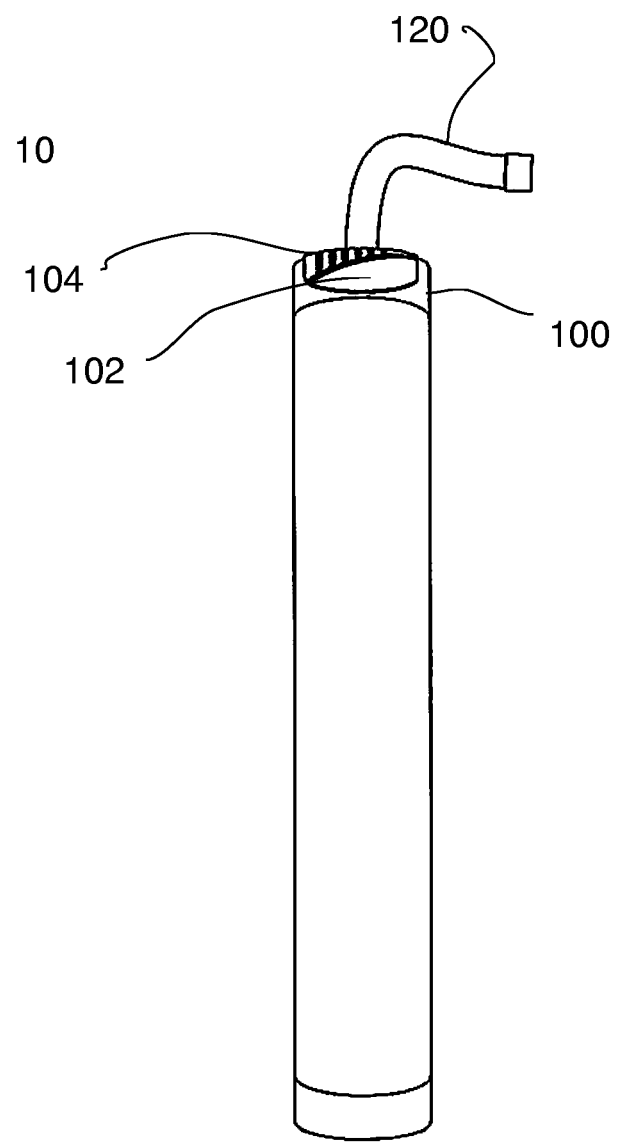
FIG. 4 shows the left side view of the device, according to the present invention.
Figure 5:
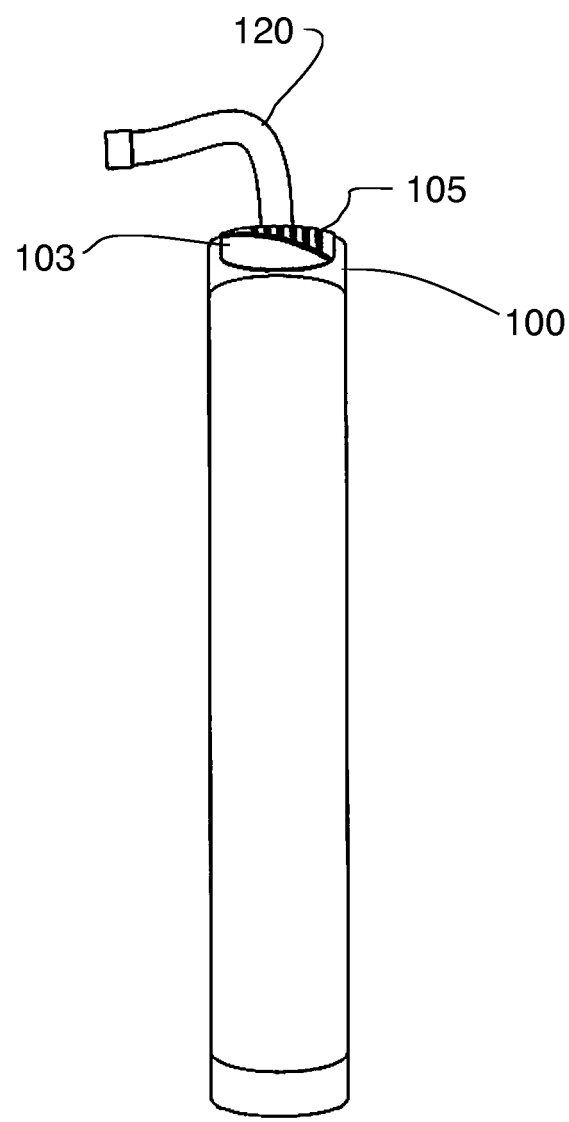
FIG. 5 shows the right side view of the device, according to the present invention.
Figure 6:
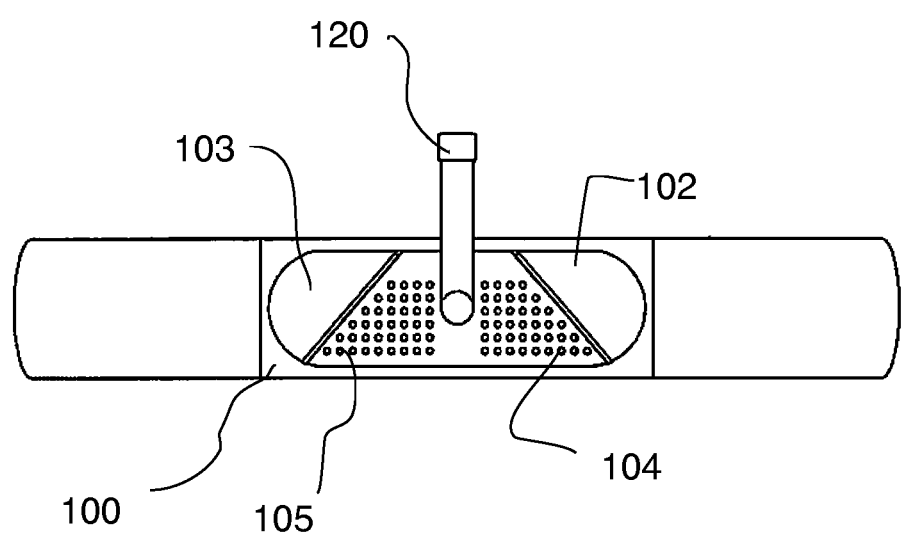
FIG. 6 shows the top view of the device, according to the present invention.
Figure 7:
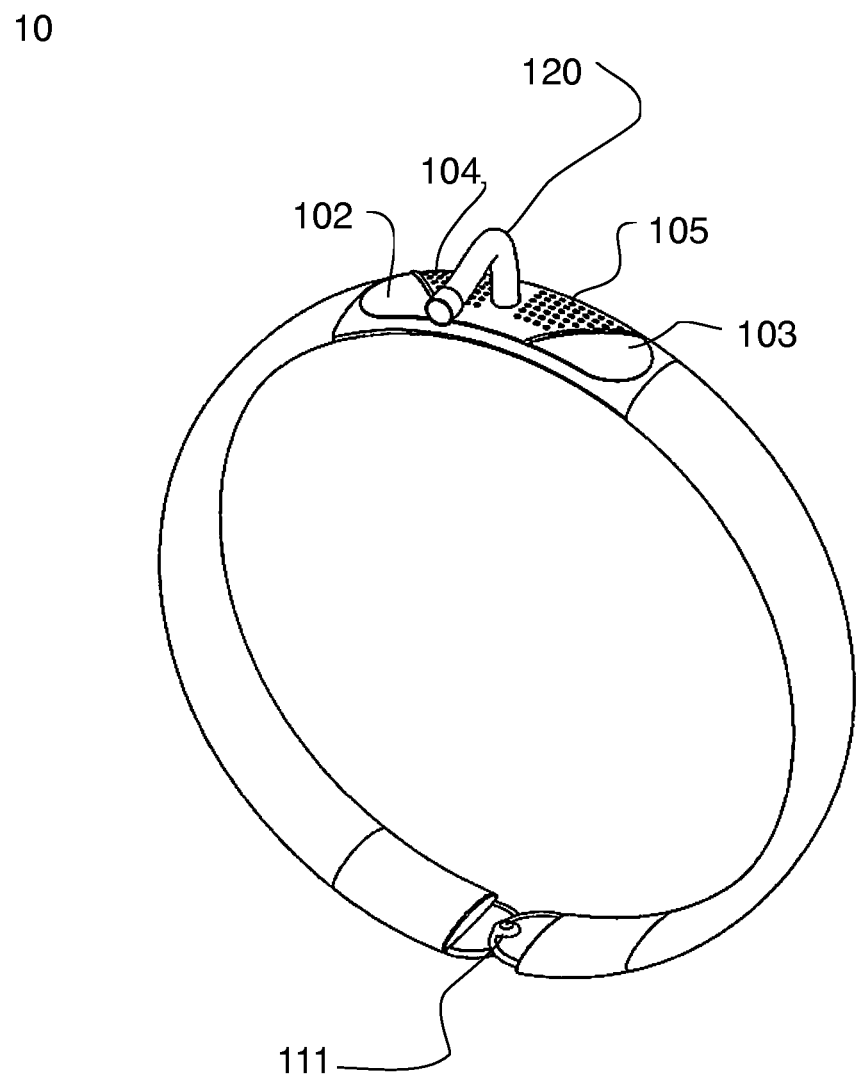
FIG. 7 shows an isometric view of the device, according to the present invention.
Figure 8:
FIG. 8 shows a view of the device in use, according to the present invention.

Referring now to the figures, FIG. 1-8 show the device, generally referred to as collar 10. The collar 10 has a circumference and is designed, sized, and configured to encircle the neck and head region of a pet or working animal 1 upon which the collar 10 is placed. The collar 10 preferably is provided in two sizes to accommodate all sizes and types of animals. The collar 10 includes a clasp 111. The clasp 111 allowing for removal and application of the collar 10 to the pet or working animal 1. The clasp 111 is located at a bottom of the collar 10 when it is worn on the pet or working animal 1 and adjustable to ensure that the collar 10 is securely affixed and comfortably worn by the animal 1. The collar 10 is designed for placement behind the ears of the animal 1 wherein, the collar 10 is fitted closely and securely to the animals 1 head region. The internal surface of the collar 10 may include an anti-slip or anti-skid surface to prevent movement of the collar 10 after it is placed onto the animal.

A top portion 100 of the collar 10, opposite the clasp portion 111, includes the primary electronic components of the collar 10 which are located within the housing 101 and an interior cavity of the collar 10. This interior cavity provides a location for many of the electrical components and associated power supply, circuitry, and wiring of the collar 10. These electrical components will include an electronic circuit board, internal memory, and a microprocessor with programmable logic to coordinate all of the associated electronic components and in communication with the various other electrical components of the collar 10. Within this housing 101 of the top portion 100 is a satellite communication chip 102, a global positioning system (GPS) communication chip 103, a speaker 104, a microphone 105 and the necessary peripheral electrical components to ensure proper operation of the collar 10.

The top portion 100 includes a stem 120. The stem 120 extends upward from the collar 10 opposite the clasp 111 and forward towards the direction of the head of the pet or working animal wearing the collar 10. In profile the stem 120 is snorkel shaped. The stem 120 is centrally located on the top portion 100 of the collar 10 and designed for placement central to the head of the animal 1 wearing the device 10. The snorkel shape and size of the stem 120 allow it to protrude over the head of the animal 1 where its capabilities and components can be fully utilized.

The stem 120 includes several useful imaging components that capture real time images seen by the animal 1. These imaging components are a thermal imaging camera 121 and sensors, an infrared camera, a standard web camera 122 for visibility in normal light, and a light source 123. The thermal imaging camera 121 is capable of receiving an infrared signal and processing this signal for use on an external device. The camera images, both thermal 121 and standard 122 are in communication with the satellite communication chip 102 and when in communication with a network or the Internet, a user may remotely view the images an external electronic device, such as a computer, smart phone, tablet, or other similar electronic device in real time as events are occurring. Further, a user may utilize the internal electronics to switch between the various cameras available to optimize the viewed image in real time.

The thermal imaging camera 121 and associated sensors enable the owner/handler to view hidden obstructions that may not be detected through normal imagery visible during the day and at night. This thermal camera 121 is most beneficial in tasks that are conducted when visibility is low or in rescue and recovery missions in perilous or obstructed environments and in searching around obstacles, under ruble, or within buildings. These thermal images can be extremely valuable in transmitting the captured heat signature of the surroundings back to the handler in real time when time is of the essence.

Adjacent to the stem 120 is the microphone 105 and the speaker 104. The microphone 105 and the speaker 104 allow for the transmission of sound from the collar 10 to a remote user and conversely from the animal 1 to the remote user. The speaker 104 and microphone 105 are in communication with the satellite communication chip 102 and when in communication with a network or the Internet, a user may remotely and audibly communicate through an external electronic device, such as a computer, smart phone, tablet, or other similar electronic device to help save lives while monitoring and instructing the animal from a remote location.

In its preferred use, the collar 10 is designed for use on a working dog in search and rescue missions in disaster situations to help save lives. Accordingly, the collar 10 can be placed onto a trained animal 1 and the animal sent on a search and rescue mission. The handler can connect to the device remotely with an electronic device utilizing the satellite communication chip 102 and communicate to the animal via the speaker 104 and view images from the cameras 121, 122 and hear sounds via the microphone 105. The handler is then able to utilize the skills of the animal 1 to complete tasks without placing the handler into harms way or further allowing the animal 1 to reach areas that could otherwise not be reached by the handler.

In addition to the search and rescue features for saving lives, the collar 10 and its two-way audio and visual display in real time to a remote location provides many positive benefits to both the animal 1 and the handler/owner. Accordingly, the collar 10 will assist various agencies in public service related tasks, such as apprehension, evacuation, security patrol, military patrol and reconnaissance, and boarder patrol and reconnaissance. These features will be of particular importance in saving lives in search, rescue, and recovery operations after natural disasters, structural collapses, terroristic events, or other similar large or small scale events that require searching through rubble, debris, wreckage or other elements that include small and dangerous places that are difficult for humans to access. Additionally, the collar 10 allows owners to connect and communicate with a beloved animal when they are away or at home. The collar 10 also allows pets to communicate with their owner if they stray or suffer from separation anxiety or lack of attention. Further, the collar 10, through its two-way audio and video features in real time allows an owner/handler to comfort a lost or stray pet until the pet is rescued. Still further, the collar 10 allows an owner to monitor their pet from a remote location in real-time to ensure the safety of their pet.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A multifunction animal communication collar, comprising:
   a band, the band having a circumference and adapted to encircle the neck and head region of the animal, the band having a top side and a bottom side, the top side designed for placement posterior to the ears of the animal, the top side including a cavity for the placement of a plurality of electronic components, the bottom side including a clasp, the clasp adjustable and allowing for the securing and removal of the band from the animal;
   the top side including a stem, the stem extending outward from the topside opposite the bottom side and forward towards the nose of the animal in a snorkel-like shape, the stem providing a housing for the placement of a camera, the camera in communication with the plurality of electronic components, wherein images from the camera are viewable remotely;
   the plurality of electronic components comprising a power source, circuitry, wiring, an electronic circuit board, an internal memory, a microprocessor with a logic component, a satellite communication chip, a GPS locator, a speaker, and a microphone; and
   the satellite communication chip capable of sending and receiving information to and from a remote user with a network or Internet connection.

2. A multifunction animal collar as in claim 1, wherein the camera is a thermographic camera.

3. A multifunction animal collar as in claim 1, wherein the camera is a web camera.

4. A multifunction animal collar as in claim 1, wherein the camera is an infrared camera.

5. A multifunction animal collar as in claim 1, wherein the camera is a combination camera, thermographic camera with thermal sensors, and infrared camera.

6. A multifunction animal collar as in claim 5, wherein a user can utilize the internal electronics of the collar to select their desired camera type for viewing.

7. A multifunction animal collar as in claim 1, wherein the stem includes a light, the light providing illumination to an area in front of the animal.

8. A multifunction animal collar as in claim 1, wherein an interior surface of the collar includes an anti-slip surface.

9. A multifunction animal collar as in claim 1, wherein the collar is available in two sizes.

10. A multifunction animal communication collar, the collar providing real time two-way audio and video communication in real time to a remote location to aid search and rescue workers in saving lives, the multifunction collar comprising:
    a band, the band having a circumference and adapted to encircle the neck and head region of the animal, the band having a top side and a bottom side, the top side designed for placement posterior to the ears of the animal, the top side including a cavity for the placement of a plurality of electronic components, the bottom side including a clasp, the clasp allowing for the securing and removal of the band from the animal;
    the top side including a stem, the stem extending outward from the topside opposite the bottom side and forward towards the nose of the animal, the stem providing a housing for the placement of a web camera, a light, a thermographic camera with associated thermal sensors, an infrared camera, the web camera, light, infrared camera, and thermographic camera in communication with the plurality of electronic components, wherein images from the camera and thermographic camera are viewable remotely in real time;
    the plurality of electronic components comprising a power source, circuitry, wiring, an electronic circuit board, an internal memory, a microprocessor with a logic component, a satellite communication chip, a GPS locator, a speaker, and a microphone; and
    the satellite communication chip capable of sending and receiving information to and from a remote user with a network or Internet connection.

11. A multifunction animal collar as in claim 10, wherein an interior surface of the collar includes an anti-slip surface.

12. A multifunction animal collar as in claim 10, wherein the collar is available in two sizes.

13. A multifunctional animal collar is in claim 12, wherein the collar is capable of co-operating with an ancillary electronic device having a dedicated and preprogrammed software application located near the animal, wherein the animal is able to view a remote user in two-way audio and video communication with the remote user.

14. A method of conducting a search and rescue mission for saving lives with an animal equipped with a multifunction animal collar, the multifunction animal collar including a satellite communication chip, a camera, a microphone, a speaker, a light, and ability to transmit received information through the satellite communication chip in real time for two-way audio and visual communication, the method comprising:

placing the multifunction animal collar onto an animal;
    designating the animal an assigned task; and
    viewing information obtained from the collar remotely in real time.

15. A method as in claim 14, wherein the camera is a thermographic camera with associated sensors.

16. A method as in claim 14, wherein the camera is an infrared camera.

17. A method as in claim 14, wherein the camera is a web camera capable of transmitting video.

18. A method as in claim 14, wherein the camera is a combination web camera, thermal camera with associated sensors, and an infrared camera.

19. A method as in claim 18, wherein a user can select the desired camera type in real time to provide alternate viewing options in use.

\* \* \* \* \*